April 2, 1935.   G. R. FOLDS   1,996,237
FURNACE CONTROL
Filed April 23, 1932

INVENTOR
George R. Folds
Jones, Addington, Ames & Seibold
ATTYS

Patented Apr. 2, 1935

1,996,237

UNITED STATES PATENT OFFICE 1,996,237

FURNACE CONTROL

George R. Folds, Chicago, Ill., assignor to Cook Electric Company, Chicago, Ill., a corporation of Illinois Application April 23, 1932, Serial No. 607,034

14 Claims. (Cl. 236—16)

My invention relates to heat regulators and more particularly to control apparatus for heating systems designed to operate automatically by suitable means, which may be thermostatically or otherwise, to provide substantially uniform or constant heat at all times.

Usually, in heating systems for homes or the like, a damper controller is employed to actuate the draft and check dampers of the heater, and, in the case of oil or gas furnaces, the controller is arranged to connect with a valve controlling the flow of oil or gas, and, in certain instances, also with the air supply supporting combustion. Where the controller is electrically operated, the circuit is connected to a thermostat responsive to room temperature so that the rate of combustion may be increased until the fire is brought to a point of supplying heat sufficient to satisfy the room thermostat. I find, however, that the temperature of the furnace increases to such an extent that the furnace necessarily continues to supply heat beyond the requirements of the room thermostat before the combustion can be checked. This results in what is known as periodic overshooting of the room temperature and causes uneven heating of the room which is undesirable and results in waste of fuel and considerable annoyance.

An object of the invention is to provide a furnace control, which, when the room thermostat calls for heat, will increase the rate of combustion until the furnace temperature reaches a predetermined degree and will thereafter decrease the rate of combustion without checking the combustion until the room thermostat is satisfied.

A further object of the invention is to provide an improved form of furnace control having a valve or damper controller connected to the room thermostat and to the furnace, adapted to operate not only in accordance with the requirements of the room thermostat, but also in accordance with the requirements of a furnace or other thermostat, whereby the combustion is temporarily decreased but not completely checked, so that the continued decreased combustion will supply only that heat which is required to satisfy the room thermostat. Accordingly, the furnace will not continue to supply heat after the room thermostat is satisfied to cause an uncomfortable temperature and an unnecessary waste of fuel.

Many other objects and advantages of the invention will be apparent from the following detailed description when taken in connection with the accompanying drawing which forms a part hereof.

Figure 1:
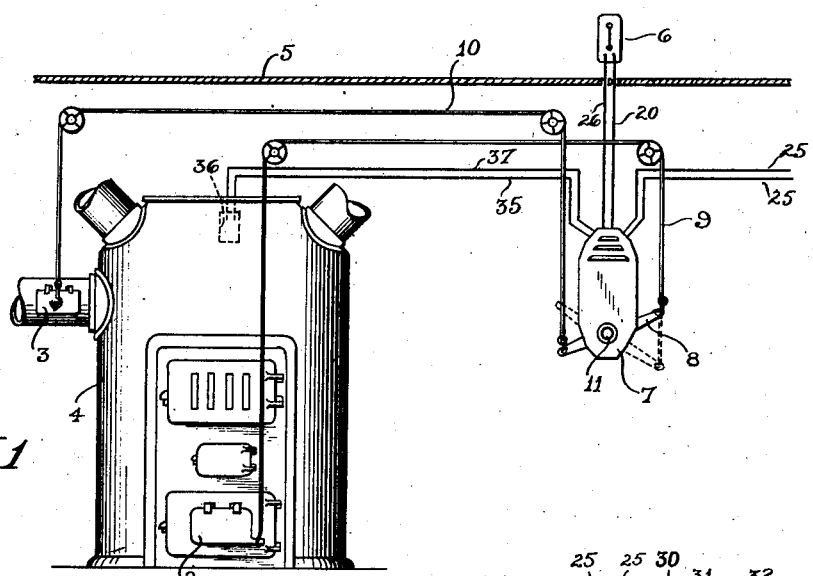
Figure 1 is a view illustrating a furnace or heater with control apparatus embodying my invention applied thereto.
Figure 3:
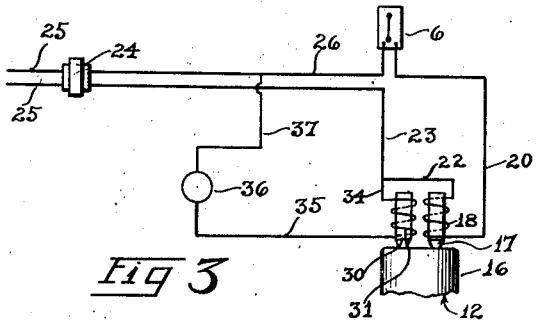
Fig. 3 is a wiring diagram illustrating the apparatus connected in circuit with a thermostat responsive to temperature of the room or rooms to be heated.

In Fig. 1, I have illustrated a furnace 4 having the usual air inlet damper 2 and the check damper 3, but it will be understood that in so far as the disclosure of the invention is concerned, the illustration is merely conventional inasmuch as the invention is capable of wide application and may be used to control elements of a heater other than the dampers. The floor of a room to be heated is indicated at 5 and a thermostat 6 is located within the room. A damper controller 7, which may be electrically operated or otherwise, and which may be of common commercial form, such as is described and claimed in co-pending application Serial No. 498,414, is connected by means of a chain 9 to draft damper 2 and by means of a chain 10 to check damper 3, there being a damper arm 8 connecting these chains to the controller. Damper controller 7 is adapted to increase the rate of combustion by moving chains 9 and 10 to open draft damper 2 and to close check damper 3 when electric current is supplied to the controller by actuation of room thermostat 6. When no current is supplied the controller operates to check combustion by moving the chains in opposite direction.

A push button 11 is provided to disconnect the drive between damper controller 7 and arm 8 to allow independent operation of dampers 2 and 3 during firing of the furnace, or for any other purpose. It will be understood that damper controller 7 may have any suitable form of motor for driving damper lever 8 to operate dampers 2 and 3.

Figure 2:
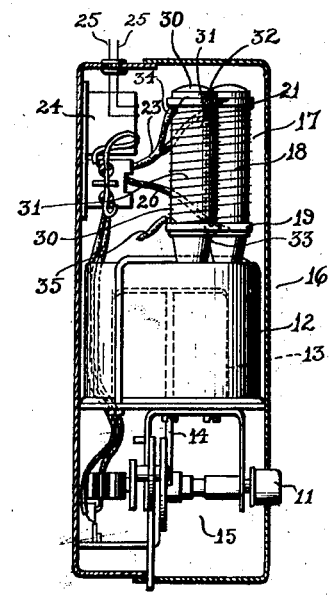
Fig. 2 is a side elevation, with the cover removed, of one form of damper controller that may be used.

For purposes of illustration, I have shown in Fig. 2 a heat motor 16 having an expansible chamber 12 provided with a movable wall 13 connected to a power arm 14. Arm 14 may be connected to damper lever 8 by a clutch designated generally as 15, which clutch, when operated by push button 11, will disconnect the drive of motor 16 to permit independent operation of dampers 2 and 3.

A detailed description of clutch mechanism 15 and the manner in which push button 11 is arranged to disconnect the drive between motor 16 and damper lever 8 is given in said co-pending application, and, consequently, it is deemed unnecessary for a clear understanding of this invention to describe this mechanism more fully.

Heat motor 16 is provided with a pair of heating tubes 17 and 30, both in communication with chamber 12 and both adapted to receive a volatile substance which extends upwardly into these tubes from chamber 12. A portion or all of the volatile substance in these tubes 17 and 30 is adapted to be vaporized by the heat effects of the flow of current through resistance coils 18 and 31 wrapped about these tubes for the purpose of expanding chamber 12 to actuate movable wall 13.

Lower terminal 19 on tube 17 is connected by wire 20 to one terminal of room thermostat 6. The opposite terminal of room thermostat 6 is connected by a wire 26 to transformer 24. Upper terminal 21 on tube 17 is connected by a wire 22 and a wire 23 to a transformer 24, the power mains being represented at 25.

Tube 30 has its resistance wire 31 conected between upper and lower terminals 32 and 33. Upper terminal 32 is connected by a wire 34 and by wire 23 to transformer 24. Lower terminal 33 is connected by a wire 35, a switch 36, and a wire 37, to say wire 26 of the opposite side of the circuit. Switch 36 may be thermostatically controlled and may be responsive to the temperature of furnace 4. However, in so far as the purposes of the invention are concerned, any device similar to switch 36 may be provided to accomplish the same result. As specifically illustrated, this switch 36 is of the type which opens its circuit only when a predetermined temperature is exceeded.

Assuming that room thermostat 6 is calling for heat due to a drop in temperature, current will flow from transformer 24 through wire 26, thermostat 6, wire 20, heat coil or resistance wire 18, wire 22, wire 23 and back to transformer 24. Current will also flow from one side of the circuit, say from wire 26 through wire 37, switch 36, wire 35, heat coil 31, wire 34 and back to the other side of the circuit, say wire 23. The heat effects produced by this current flow through resistance wires 18 and 31 will vaporize a portion or all of the volatile fluid in tubes 17 and 30, depressing the level of the unvaporized fluid below the heating zone and expanding chamber 12, thereby driving arm downwardly to swing damper lever 8 clockwise. This action of damper lever 8 opens draft damper 2 and closes check damper 3. The reverse movement of dampers 2 and 3 occurs when the increased combustion in the furnace 4 produces sufficient heat to satisfy the demands of room thermostat 6.

To prevent the heat of furnace 4 from overshooting the room temperature demanded by thermostat 6, switch 36 is arranged to open the circuit upon a predetermined rise in temperature of the furnace, which furnace temperature is not sufficient upon the opening of thermostat 36 to furnish the heat required to satisfy the room thermostat. The current will discontinue flowing through the circuit of switch 36, and tube 30 will cool to condense the vapor therein and reduce the pressure so that this volatile fluid may again rise in the tube to allow expansible chamber 12 to contract, say, half-way, in order to swing damper lever 8 counterclockwise to a midway position, or so, depending upon the adjustment desired, between its on and off position whereby to partly close draft damper 2 and slightly open check damper 3, if so desired. It will be understood that the extent of the return movement of damper lever 8 to alter the position of the dampers at this point in the operation of the heater may be predetermined by the capacity of tube 30 with respect to the combined capacities of both tubes. This action may be arranged to allow draft damper 2 to close half way or any other fraction of its completely opened position, if so desired, and likewise, to alter the position of the check damper 3, if so desired.

Furthermore, any number of tubes similar to tubes 30 may be provided. These tubes may be under the control of different circuits having one or more switches similar to switch 36 so as to vary the degree of closing movement in accordance with the desired continued combustion of furnace 4 after a predetermined furnace temperature is reached to prevent overshooting the room temperature demanded by thermostat 6 whereby to provide a relatively constant room temperature at all times.

After the circuit of switch 36 is opened and draft damper 2 slightly closed, the rate of combustion of the fire will be decreased but the combustion will continue at the decreased rate until the circuit of thermostat 6 is opened. When thermostat 6 opens, tube 17 will cool to condense the vapor and totally relieve the volatile fluid in chamber 12 of vapor pressure so as to allow a portion of the volatile fluid to return in tube 17 and bring damper lever 8 clockwise to its off position.

Figure 4:
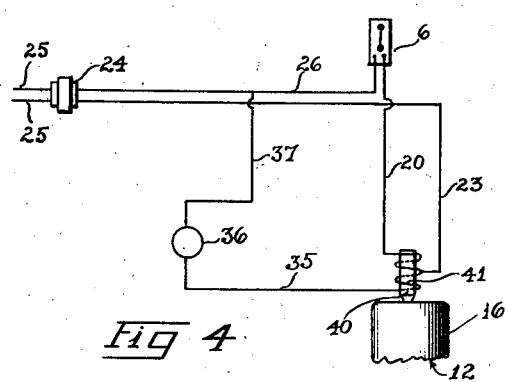
Fig. 4 is a similar view illustrating an alternative form of electrical connections for the control apparatus.

As stated above, checking the increased rate of combustion after a predetermined furnace temperature is obtained to prevent overshooting of the room thermostat by the continued combustion of the fire until room thermostat 6 opens, may be accomplished in various ways. There is illustrated in Fig. 4 heat motor 16 provided with a heating tube 40 having a single resistance wire or heat coil 41 about this tube, but so connected to the circuit of room thermostat 6 and the circuit of switch 36 that after the latter circuit is opened, the heat produced by the current flow through heat coil 41 is reduced sufficiently to allow a return of the volatile substance a part of the way upwardly in this tube in order to return damper lever 8 to any desired position to alter the open position of draft damper 2, and, if so desired, the check damper 3. This is accomplished by connecting the circuit of room thermostat 6 to a predetermined number of turns of the upper portion of the heat coil so as to limit the heating zone of tube 40 by the current flowing through the circuit of room thermostat 6. The circuit of switch 36 is connected to the remaining turns of the lower portion of the heat coil so that when current flows through this circuit all the volatile fluid in tube 40 will be vaporized and held depressed in chamber 12 to keep the damper lever 8 at its full "on" position. This arrangement is obtained by connecting wire 20 of room thermostat circuit to the upper terminal of resistance coil 41 and wire 23 to an intermediate turn of this resistance coil. Wire 35 of the circuit of switch 36 is connected to the lower terminal, the wire 23 forming a common return for both circuits. It is obvious, therefore, that the result of returning damper lever 8 to any intermediate position after the furnace temperature reaches a predetermined degree may be obtained in various ways, and consequently I do not intend being limited to the specific structures shown.

By similarly applying the apparatus to the fuel supply system of an oil or gas-fired furnace, the same may be controlled in exactly the same manner. The term damper controller is, therefore, intended also to refer to a controller capable of being used with oil or gas-fired furnaces or for operating any type of valve in a heating system or other system controlled in accordance with a variable operating condition. On the other hand, the wiring shown herein is the so-called two-wire system. Various commercial types of damper controllers and thermostats require three-wire systems. It will be understood that such controllers and thermostats may be used as part of the apparatus for carrying out the invention described herein by connecting the same in an analogous manner. Other variations in the details of the invention are possible without departing from the broad features thereof.

I claim

1. In a furnace control, the combination of apparatus for controlling combustion, a motor for operating said control apparatus, a plurality of control circuits each having a thermostatically operated switch therein, said thermostatically operated switches operating said control circuits according to temperature changes of different locations, said control circuits operating said motor and said control apparatus to establish combustion at a relatively accelerated rate when the temperatures of both of the locations drop below predetermined points, to establish combustion at a less rate when the temperature of either of the locations is above a predetermined point, and to check combustion when the temperature of both locations rise above predetermined points.

2. In a furnace control, the combination of apparatus for controlling combustion, a motor for operating said control apparatus, said motor having three positions of operation, and two thermostats in the circuit with said motor, each thermostat being responsive to temperature conditions of different locations for operating said motor, said motor being actuated to one of its positions by a predetermined temperature change of both of said locations, to its second position by a predetermined temperature change of one of said locations, and to its third position by a restoration of the temperatures of both locations.

3. In a furnace control, the combination of electrically operated apparatus for controlling combustion, a thermostat responsive to temperature of one location, a thermostat responsive to temperature of another location, and electrical connections between said control apparatus and said thermostats by means of which said control apparatus accelerates combustion at predetermined temperatures of both of said locations, decreases combustion but without checking it at a predetermined temperature of either of said locations, and checks combustion after a continuation of the combustion at such decreased rate restores the predetermined temperatures of both locations.

4. In a furnace control, the combination of electrically operated apparatus for controlling combustion, thermostatic apparatus responsive to furnace and room temperatures, and electrical connections between said control apparatus and said thermostatic apparatus by means of which said control apparatus accelerates combustion at predetermined low room and furnace temperatures, decreases combustion but without checking it at a predetermined furnace temperature, and checks combustion only after decreased combustion has continued for a time sufficient to restore the room temperature.

5. In a furnace control, the combination of electrically operated apparatus for controlling combustion, thermostatic apparatus responsive to room temperature and to a temperature of a different location, and electrical connections between said control apparatus and said thermostatic apparatus by means of which said control apparatus accelerates combustion at predetermined low room and different location temperatures, decreases combustion but without checking it at a predetermined temperature of said other location, and checks combustion at a predetermined high room temperature after decreased combustion has continued for a time sufficient to restore the room temperature.

6. In a furnace control, the combination of apparatus for controlling the combustion, a thermostat responsive to furnace temperatures adapted to open when a predetermined high temperature is reached, a thermostat responsive to room temperature, and connections between said thermostats and said control apparatus by which said control apparatus will actuate upon a predetermined drop of room temperature to accelerate combustion until said predetermined high furnace temperature is reached but before the said room thermostat is satisfied and will thereafter continue the combustion at a definitely fixed decreased rate but not checked until the room temperature rises and said room thermostat is satisfied.

7. In a furnace control, the combination of apparatus for controlling the combustion, a thermostat responsive to room temperature for said control apparatus, a thermostat responsive to furnace temperature for said control apparatus, said control apparatus having a motor controlled by the positions of said thermostats, said motor operating to accelerate the rate of combustion when said thermostats are at given positions and to decrease the rate of combustion upon a change of position of one of said thermostats and to continue the decreased rate of combustion until checking the combustion upon a change of position of the other thermostat.

8. In a furnace control, the combination of electrically operated combustion control apparatus including an electrically driven motor having an actuating member driven thereby, a thermostat responsive to room temperature, a thermostat responsive to furnace temperature, and electrical connections between said motor and said thermostats and connections between said motor driven actuating member and the furnace for controlling the rate of combustion, the rate of combustion being accelerated upon a predetermined drop of room or furnace temperatures and decreased upon a predetermined rise of furnace temperature, the thermostat circuit remaining closed to prevent complete checking of the combustion until a predetermined room temperature is reached.

9. In a furnace control, the combination of electrically operated combustion control apparatus including an electrically driven motor having an actuating member adapted to have a given range of movement to actuate one or more of the combustion controlling devices of a furnace, connections between said actuating member and said combustion controlling devices, a thermostat responsive to room temperature, a thermostat responsive to furnace temperature, and electrical connections between said motor and said thermostats by means of which said motor operates said actuating member through its given range of movement to actuate said combustion controlling devices, and further operates said actuating member to return it to an intermediate position to alter the position of said combustion controlling devices without returning the latter to their original position.

10. In a furnace control, the combination of electrically operated combustion control apparatus including an electrically driven motor having an on and an off position and an intermediate position, connections between the combustion controlling devices of a furnace and said motor, whereby said combustion controlling devices will be operated according to the position of said motor, a thermostat responsive to room temperature, a thermostat responsive to furnace temperature, and electrical connections between said motor and said thermostats for operating said motor either to on, intermediate or off positions.

11. In a furnace control, the combination of electrically operated combustion control apparatus including an electrically driven motor having an on and an off position and an intermediate position, connections between the combustion controlling devices of a furnace and said motor whereby said combustion controlling devices will be operated according to the position of said motor, a pair of thermostats, and electrical connections between said motor and said thermostats for operating said motor either to on, intermediate or off positions.

12. In a furnace control, the combination of electrically operated combustion control apparatus including a heat motor having an electric heat coil therefor, a thermostat responsive to room temperature, a thermostat responsive to furnace temperature, and electrical connections between said heat coil and said thermostats by means of which the current flow producing the heat effects operating said motor may be controlled by the position of said thermostats, the rate of combustion being increased by maximum current flow while both thermostats are actuated and decreased but not checked while one of said thermostats remains actuated until a predetermined room temperature is reached.

13. In a furnace control, the combination of electrically operated combustion control apparatus including a heat motor having a pair of electric heat coils, a thermostat responsive to room temperature furnishing the flow of current to one of said heat coils, a thermostat responsive to furnace temperature furnishing the flow of current to the other heat coil, and connections between said motor and a furnace by means of which the rate of combustion is accelerated by the current flowing through both heat coils and the rate of combustion is decreased but not checked by the current flowing through one heat coil.

14. In a furnace control, the combination of apparatus for controlling combustion, a motor for operating said control apparatus, said motor having three positions of operation, and two thermostats in circuit with said motor, each thermostat being responsive to a rise or fall of temperature at different locations, said motor being actuated to its first and third positions when said thermostats are both in actuated position or non-actuated position at the same time, and to its intermediate or second position when only one of said thermostats is in actuated position.

GEORGE R. FOLDS.